US010496831B2

(12) United States Patent
Lancioni et al.

(10) Patent No.: US 10,496,831 B2
(45) Date of Patent: Dec. 3, 2019

(54) DYNAMIC ELECTRONIC DISPLAY PRIVACY FILTER

(71) Applicant: Intel Corporation, Santa Clara, CA (US)

(72) Inventors: German Lancioni, Cordova (AR); Mario L Bertogna, Cordova (AR); José Pablo Piccolotto, Cordova (AR); Tamir Damian Munafo, Naale (IL)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 15/270,343

(22) Filed: Sep. 20, 2016

(65) Prior Publication Data

US 2018/0082068 A1   Mar. 22, 2018

(51) Int. Cl.
*G06F 21/60* (2013.01)
*G06F 21/62* (2013.01)

(52) U.S. Cl.
CPC ........ *G06F 21/604* (2013.01); *G06F 21/6245* (2013.01)

(58) Field of Classification Search
CPC ............................ G06F 21/604; G06F 21/6245
See application file for complete search history.

(56) References Cited

U.S. PATENT DOCUMENTS

| 2005/0235217 A1* | 10/2005 | Hoe-Richardson ..... G06F 21/84 715/768 |
| 2005/0270372 A1* | 12/2005 | Henninger, III ............................ G08B 13/19667 348/143 |
| 2008/0016442 A1* | 1/2008 | Khoo ..................... G06Q 30/02 715/700 |
| 2010/0296705 A1* | 11/2010 | Miksa .................... G01C 11/02 382/106 |
| 2011/0206285 A1* | 8/2011 | Hodge .................... G06F 21/84 382/224 |
| 2011/0309933 A1* | 12/2011 | Marino ................. G01S 5/0252 340/539.32 |
| 2014/0283100 A1* | 9/2014 | Harrison ............. G06F 21/6245 726/26 |

(Continued)

FOREIGN PATENT DOCUMENTS

WO    WO-2018004524 A1 *  1/2018 ............... G06K 9/30

*Primary Examiner* — Carl G Colin
*Assistant Examiner* — Vance M Little
(74) *Attorney, Agent, or Firm* — Schwegman Lundberg & Woessner, P.A.

(57) ABSTRACT

A privacy filter for an electronic display (e.g., of a mobile device) may be dynamically applied based on multiple factors. The application of the privacy filter may include determining that data to be displayed on the electronic display is of a private nature. If so, a location context is then determined based on whether the location of the electronic display is public and therefore someone other than the user of mobile device might view the electronic display. If the location is public, boundaries associated with an area of the electronic display where the private data is to be displayed may be detected so that a privacy filter may generated dynamically based on the data, the location context and the boundaries. The privacy filter is configured to restrict the viewing angle of the entire electronic display or of a sub-area of the electronic display within the determined boundaries.

25 Claims, 9 Drawing Sheets

(56) References Cited

U.S. PATENT DOCUMENTS

| | | | | |
|---|---|---|---|---|
| 2015/0113666 A1* | 4/2015 | Buck | .................. | G06F 21/50 |
| | | | | 726/28 |
| 2015/0302621 A1* | 10/2015 | Liu | .................. | G06T 11/60 |
| | | | | 345/647 |
| 2016/0357947 A1* | 12/2016 | Cohen | ................ | G06F 3/013 |

* cited by examiner

DYNAMIC ELECTRONIC DISPLAY PRIVACY FILTER

TECHNICAL FIELD

Embodiments described herein relate to privacy filters for electronic displays, and more particularly, to the dynamic application of privacy filters that obscure only a portion of the display based on a private nature of a displayed content and a detected location context of the electronic display.

BACKGROUND

The proliferation of mobile and Internet of Things (IoT) devices provides users with the ability to conduct personal and business matters outside of the home or office. Therefore, it would useful to have options for keeping personal and business data safe from prying eyes while using these devices. For example, mobile devices may be used to send/receive e-mails or access banking information, either of which may result in the display of private information that users do not want to share with the public. In a public space such as an airport, train station or coffee shop there are always other people located in close proximity and able to view the display screen of a mobile device. The only privacy options usually available to a user are trying to hide the device from others or significantly lowering the brightness of the display. However, these may not be entirely effective or convenient options. Furthermore, the use of a physical (e.g., plastic) privacy filter that is placed over display screen to restrict the viewing angle of the screen may be cumbersome and often lower the brightness of the screen so that a device user's viewing experience is affected.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
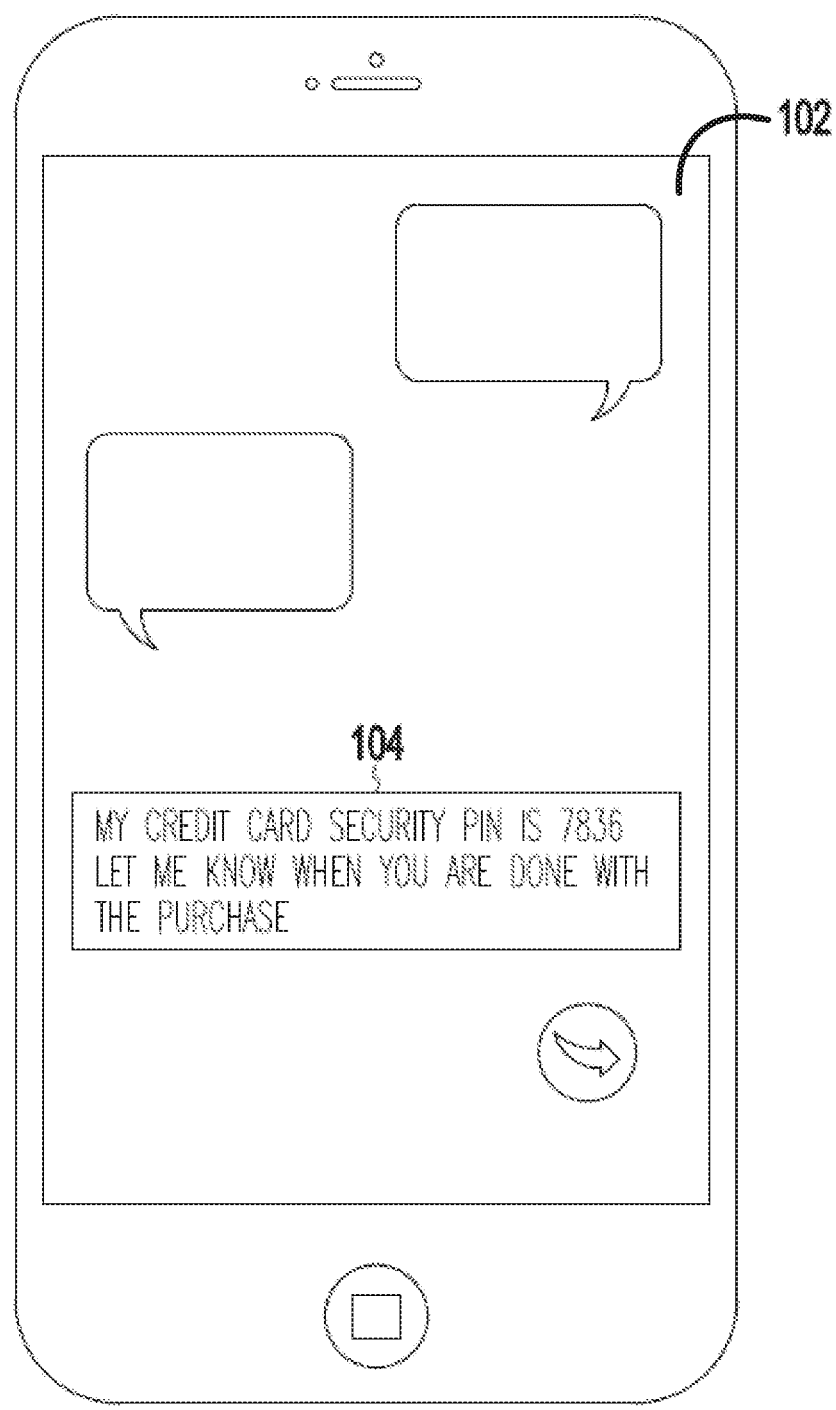
FIGS. 1A and 1B illustrate an electronic display of a mobile device viewed from two different angles, for use with one or more embodiments described herein.

Embodiments described herein provide systems, methods and computer readable media for dynamically applying a privacy filter (e.g., as a layer) to an electronic display. A portion of an electronic (e.g., LCD) display screen may be dynamically obscured so as to provide a wider viewing angle for displayed content that is not determined to be private and a narrower viewing angle for displayed content that is determined to be private (e.g., a credit card number). The privacy filter may be applied to a portion of the electronic display based on the determination that data that will be displayed in the portion of the display is private. The determination may be made, for example, based on a type of the data, an application associated with the data or a tag embedded in a portable document format (PDF document) or embedded in a hypertext markup language (HTML) web page that is to be displayed on the electronic display. The application of the privacy filter to the electronic display may also be based on a determination of a location context of the electronic display. The location context may include a detection of the location of the electronic display and characterization of the location as public or private. For example, a global positioning system (GPS) receiver may be used to detect the location of the electronic display and stored map data may be accessed to determine if the location is a known public location, such as a supermarket shopping location. If the map data does not allow for a characterization of the location as public, it may still be characterized as such based on other location context data such as an ambient noise level that may be indicative of a crowded public location.

In some embodiments, the application of the privacy filter to the electronic display may also be based on boundaries detected for the data that has been determined to be of a private nature so that only a portion of the electronic display within the detected boundaries is obscured in order to provide a narrower viewing angle. In this way a user may enjoy the portions of the electronic display which are not displaying private data at a wider range of viewing angles. Alternatively, if private data (e.g., associated with an application configured for privacy) is to be displayed in a public location (e.g., based on a detected location context) and no boundaries for the private data are able to be determined (e.g., a private document that is viewed on the entire display) then the boundaries may be set to the outer edges of the display so that the privacy filter obscures the entire display at larger viewing angles.

Many applications used on mobile devices provide an electronic keyboard for accepting user input via a touch-sensitive electronic display of the mobile device. The portion of the electronic display including the keyboard should not be obscured by a privacy filter, however any text entered by the user may require the application of a privacy filter depending on the nature of the text and the location context of the electronic display. For example, a privacy filter comprising a dark/gray background, a seamless pattern composed of asymmetric curved lines and a dynamically adjusted opacity in consideration of the current display brightness may greatly obscure the private data at a wide viewing angle (e.g., 45° or greater) like that of an observer seated or standing next to the user of the mobile device.

When applied to a portion of the electronic display, such a privacy filter greatly reduces the possibility of prying by the observer from a side angle, since the privacy filter augments the reflection effect of the electronic display from the side angles. However, a user of the device facing the electronic display from directly in front is still able to see the portion of the electronic display including the private content. FIGS. 1 and 2 (described below) illustrate the basic principle of such a privacy filter in action.

In embodiments described herein, values associated with the privacy filter may be selected by a user of a mobile device to control the level of obscurity that is provided for the private data at a wider viewing angle. For example, a control panel (like the one shown in FIG. 7) may be provided so that the use can select the darkness of the gray background, the density of the seamless pattern and the level of opacity and/or contrast of the screen such that it is difficult or impossible for the user to discern the private data in at least one of the following conditions: a viewing angle of 45 degrees, a viewing distance of 23 inches, an ambient light level of 420 lux ambient light and a font size of 10 points or less.

In an embodiment, the dynamic application of a privacy filter may be included as part of an application or as a combination of a secure service and secure embedded controller as a main component of an operating system. When the dynamic application of a privacy filter is included as part of an application, a developer may be able to provide programmatic indications regarding whether and where private data content (e.g. personal information) is displayed in order to render the privacy filter at runtime in an area of the electronic display where the private data content is to be displayed. For example, if the user is entering credit card information in an online shopping application, an area comprising a text field displaying the credit card number (e.g., private data) would provide the boundaries for the privacy filter to obscure the credit card number. In this way, the privacy filter will be rendered over the specified text field in order to protect the credit card number from the prying eyes of nearby observers.

In an embodiment, the dynamic application of a privacy filter may be included as part of a hardware solution so that the rendering of the privacy filter is independent of any application or operating system and therefore much more secure against software based malware attacks.

Figure 1B:
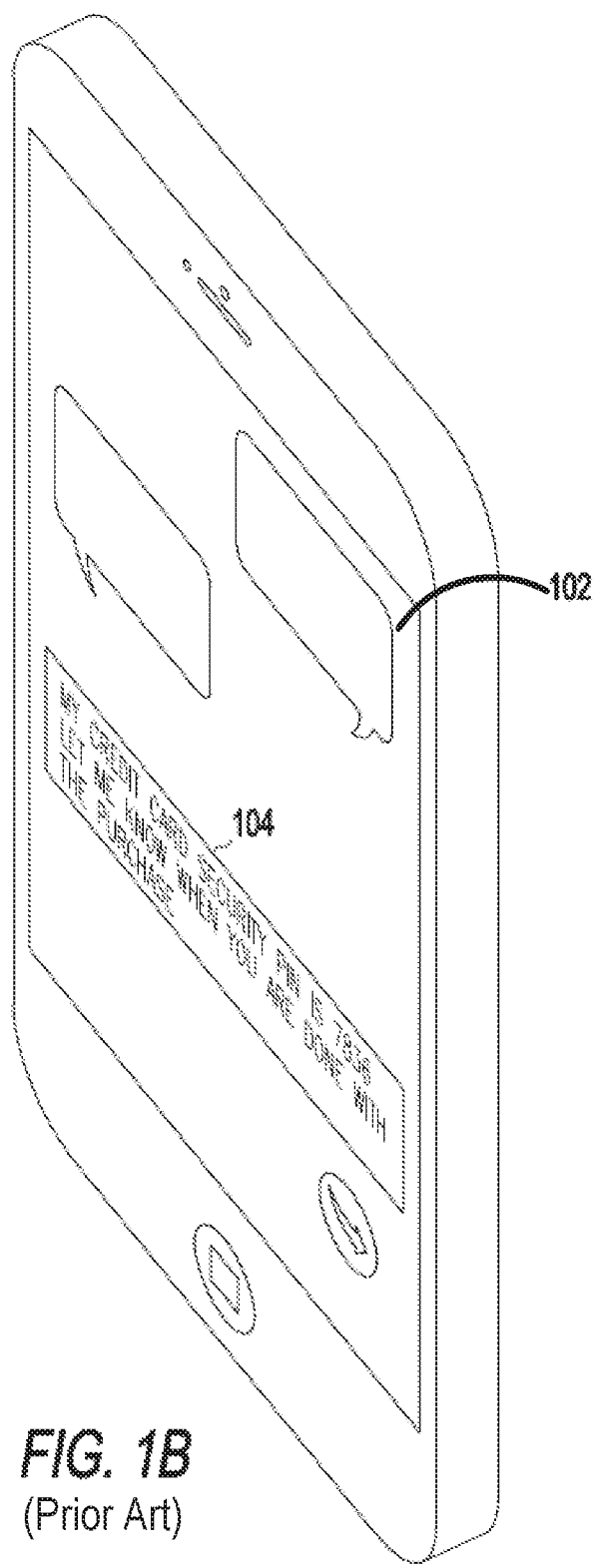

FIGS. 1A and 1B illustrate an electronic display 102 of a mobile device viewed from two different angles, for use with one or more embodiments described herein. Although the display 102 is shown as that of a mobile device it may alternatively be the display 102 of, for example, a smartphone, a tablet or a laptop computing device. In some embodiments, the display 102 may serve as a display for a desktop computer or workstation. As is shown in FIG. 1A, the display 102 is being used to send messages (e.g., via a short message service (SMS)) which may include private data. In the example of FIG. 1A and FIG. 1B, the message being typed into text box 104 of display 102 includes a credit card security PIN "7896" that a user would surely consider private and would not other nearby viewers to observe. However, nearby viewers with keen eyes would still be able to discern the credit card security PIN from a wide viewing angle (e.g., 45° or greater) as may be seen in text box 104 of display 102 of FIG. 1B.

Figure 2A:
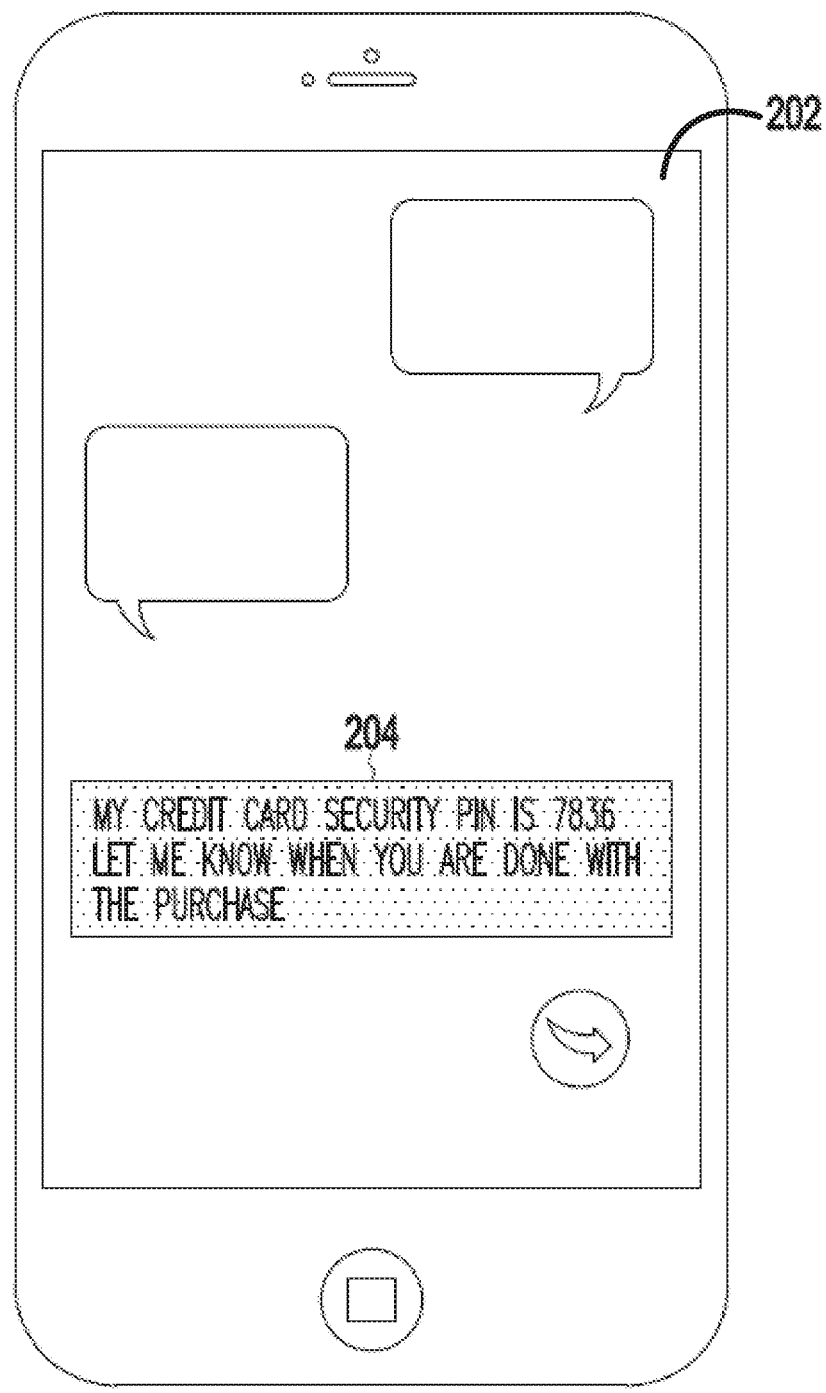
FIGS. 2A and 2B illustrate an electronic display of a mobile device viewed from two different angles with a privacy filter dynamically applied to an area of the display, according to one or more embodiments described herein.
Figure 2B:
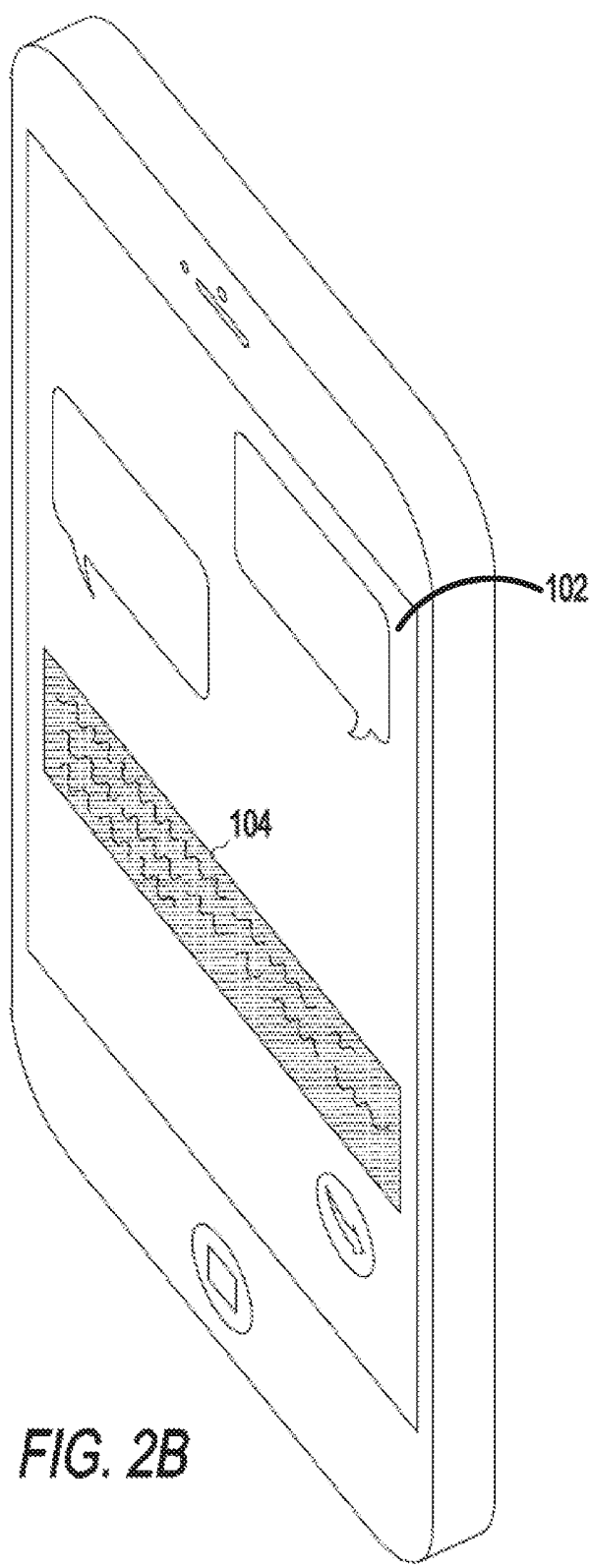

FIGS. 2A and 2B illustrate an electronic 202 display of a mobile device viewed from two different angles with a privacy filter dynamically applied to an area of the display, according to one or more embodiments described herein. As in the example of FIG. 1A described above, the display 202 is being used to send messages (e.g., via a short message service (SMS)) which may include private data. In the example of FIG. 2A and FIG. 2B, the message being typed into text box 204 of display 202 includes a credit card security PIN "7896" that has been determined to be private in nature (e.g., based on being matched to stored credit card information of a user) and therefore, because the location of the electronic display 202 has been determined to be a public location (e.g., based on detecting a public Wi-Fi network) a privacy filter has been applied (e.g., as a layer) over the text box 204. In contrast to the example of FIGS. 1A and 1B, although a user viewing electronic display 202 from directly in front would still be able to discern the content of text box 204, nearby viewers (even those with keen eyes) would not be able to discern the credit card security PIN from a wide viewing angle (e.g., 45° or greater) as may be seen in text box 204 of display 202 as shown in FIG. 2B.

Figure 3:
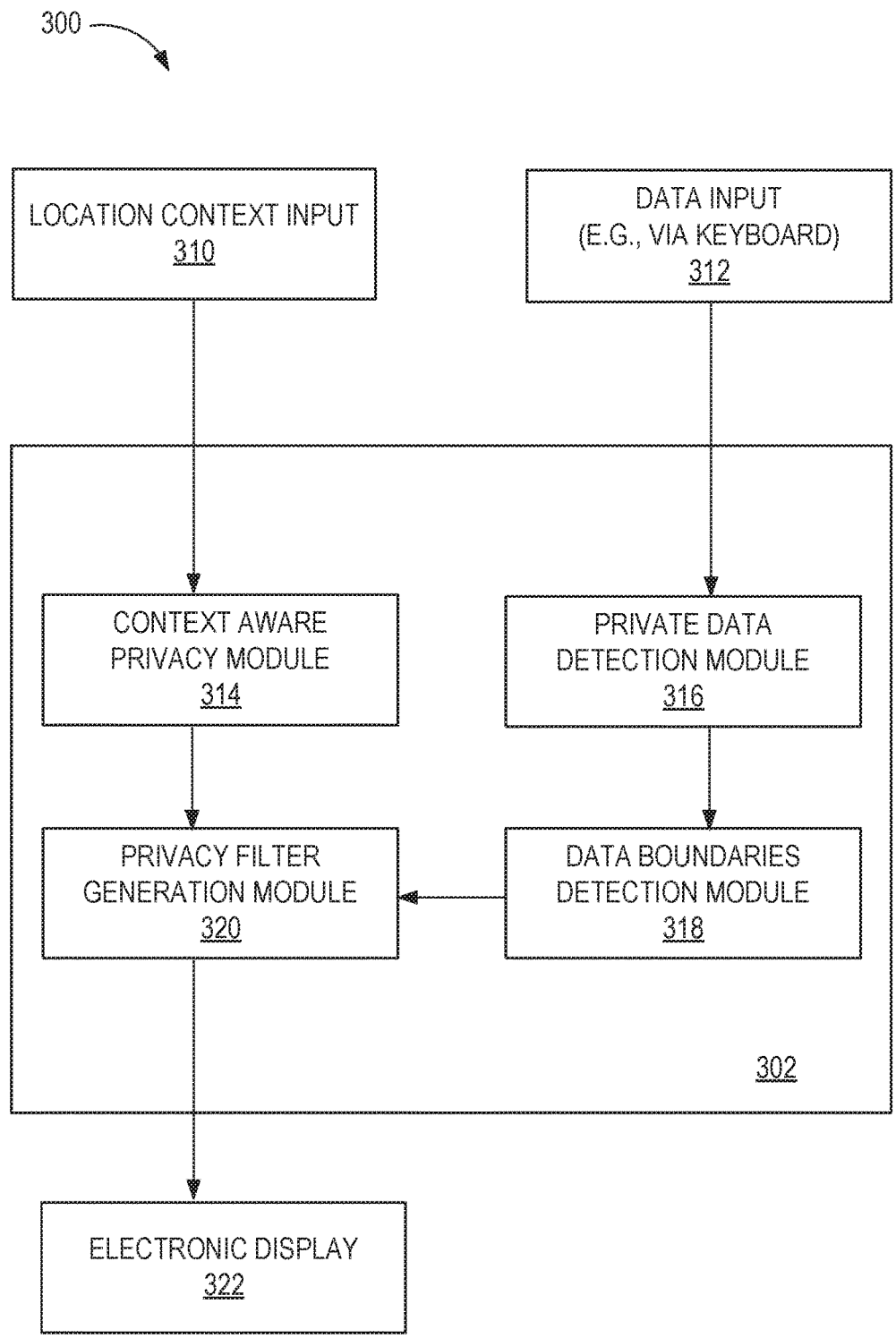
FIG. 3 illustrates a block diagram of a system for dynamically applying a privacy filter to an electronic display according to one or more embodiments described herein.

FIG. 3 illustrates a block diagram of a system 300 for dynamically applying a privacy filter to an electronic display 322 according to one or more embodiments described herein. As noted above with respect to FIGS. 1A-B and 2A-B, display privacy module 302 of system 300 may be part of any sort of computing or communication device, fixed or mobile, such as, for example, a laptop, a tablet, a smartphone or a workstation. The display privacy module 302 may be configured to dynamically apply a privacy filter to a portion of electronic display 322 based on private data content to be displayed and/or a location context associated with the electronic display 322 and/or detected boundaries of the portion of the electronic display 322 that include the private data content, as will be explained in more detail below. The electronic display 322 may be any type of electronic display, such as a liquid crystal display (LCD), a light emitting diode (LED), organic light emitting diode (OLED), plasma, etc. The electronic display 322 may be configured (e.g., hardware or software or both) with a viewing angle restriction mechanism (e.g., a privacy filter layer) that is dynamically applicable by system display privacy module 302 in response to detection of various privacy criteria as explained herein. For example, display privacy module 302 may apply a privacy filter comprising a dark/gray background, a seamless pattern composed of asymmetric curved lines and a dynamically adjusted opacity in consideration of the current display brightness in order to obscure an area of electronic display 322 at a wide viewing angle (e.g., 45° or greater). As noted above, a user facing display 322 from substantially directly in front is still able to see the content displayed on electronic display 322 clearly enough to discern any displayed data.

The display privacy module 302 is shown to include a context aware privacy module 314, a private data detection module 316, a data boundaries detection module 318 and a privacy filter generation module 320. The private data detection module 316 may be configured to detect privacy attributes associated with data input 312 to be displayed by the electronic display 322. In some embodiments, the privacy attributes may include a type of the data input 312 (e.g., known credit card number format), an application associated with the data input 312 (e.g., banking application) or a matching of the data 312 to data designated as private by a user (e.g., user's home address). In another embodiment the privacy attribute of data input 312 may comprise a tag embedded in the data input 312, wherein the data input 312 may include documents, such as PDF documents, or web pages comprising HTML codes. The private data detection module 316 may be configured to detect or extract such tags in the PDF or HTML data input 312 or in other types of data files.

The data boundaries detection module 318 may be configured to detect an area of the electronic display 322 where the data input 312 is to be displayed (e.g., text box 204 of electronic display 202 of FIG. 2). The data boundaries detection module 318 may be configured to automatically detect private content (e.g. personal information being typed on the device) in data input 312 in so that a privacy filter may be rendered only over the area of the electronic display 322 where the data input 312 is to be displayed. This automatic detection may be accomplished using a collection of PII (Personal Identifiable Information) rules that are analyzed by the data boundaries detection module 318 at runtime. In an embodiment, the data boundaries detection module 318 analyzes text (e.g., data input 312) entered by a user through a keyboard associated with electronic display 322 (e.g. smartphone soft keyboard). Once PII is detected in the data input 312, the rendering of the privacy filter over the area of display 322 where the PII is to be displayed (e.g., according to an application associated with the PII is triggered. Alternatively, if PII is to be displayed in a public location (e.g., based on a detected location context) and no boundaries for the PII are able to be determined (e.g., no text box or other identifiable sub-area of electronic display 322 specified by an application associated with the PII) then the data boundaries detection module 318 may set the boundaries to the outer edges of the display 322 so that the privacy filter obscures the entire display 322 at larger viewing angles (e.g., 45° or greater).

The context aware privacy module 314 may be configured to determine a location context of electronic display 322 based on an location context input 310 received from sensors and/or applications associated with the electronic display 322. The location context may include the location of the electronic display 322 and a determination of whether that location is a public (e.g., crowded location) or a private location (e.g., a user's home). For example, a calendar application may indicate that a user of electronic display 322 is currently in a meeting with several colleagues and therefore the current location of electronic display 322 should be characterized as a public location. A more detailed description of the operation of the context aware privacy module 314 is provided below with respect to FIG. 4.

The privacy filter generation module 320 may be configured to receive privacy indications provided by the private data detection module 316, the data boundaries detection module 318 and the context aware privacy module 314 in order to determine whether or not a privacy filter should be rendered over a portion of display 322 based on these privacy indications. It is noted that multiple privacy filters may be used, such that each of the multiple privacy filters may obscure separate and distinct portions of the display 322. In the case of a determination that a privacy filter is needed, the privacy filter generation module 320 may generate a privacy filter to narrow the viewing angle of the portion of the display 322. A more detailed description of the generation of the privacy filter by privacy filter generation module 320 is provided below with respect to FIGS. 6 and 7.

Figure 4:
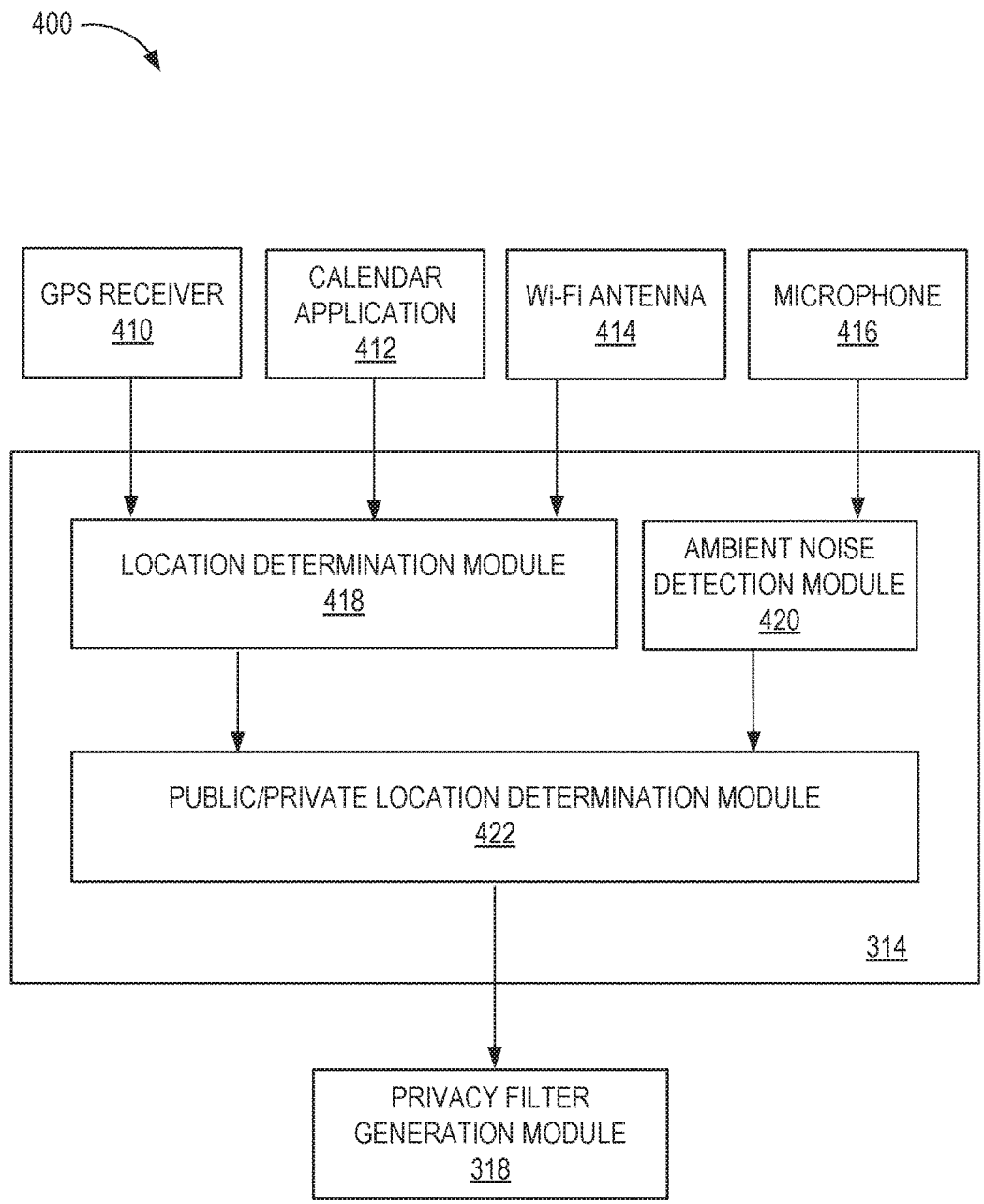
FIG. 4 illustrates a block diagram of a context aware privacy module for determining a location context of an electronic display according to one or more embodiments described herein.

FIG. 4 illustrates a block diagram of a context aware privacy module 314 for determining a location context of electronic display 322 according to one or more embodiments described herein. The context aware privacy module 314 is shown to receive location context input (e.g. 310) from a GPS receiver 410, a calendar application 412, a Wi-Fi antenna 414, or a microphone 416. The context aware privacy module 314 may also receive location context input 310 from any other type of sensor that could provide information relevant to making a decision regarding a possible need for privacy at a location of electronic display 322. For example, a proximity sensor or camera may be configured to detect the presence of a person within a threshold distance (e.g., 24 inches). The context aware privacy module 314 also includes a location determination module 418, an ambient noise detection module 420 and a public/private location determination module 422.

In some embodiments, GPS receiver 410 may be used to detect the location of the electronic display 322. For example, data received from the GPS receiver 410 may be compared to stored (or public) map data in order to detect the location of electronic display 322. In addition, stored (or public) map data may be used to determine if the location of electronic display 322 is a known public location, such as sports stadium. If the map data does not allow for a characterization of the location as public, it may still be characterized as such based on other location context data such as described below.

In some embodiments, the calendar application 412 may be configured to indicate a current scheduled location of a user of electronic display 322. For example, the calendar application 412 may indicate that the user of electronic display 322 is currently scheduled to be at a birthday party and therefore the current location of electronic display 322 should be characterized as a public location even if it would otherwise not be (e.g., when held at a private home).

In some embodiments, the Wi-Fi antenna 414 may be configured to detect a computer network in the environment or region around the electronic display 322. For example, Wi-Fi antenna 414 may detect a public Wi-Fi network at a public location such as at a small coffee shop that may not be detectable as a public location by consulting map or detecting an ambient noise level. The detection of the public Wi-Fi network by Wi-Fi antenna 414 may be used by the public/private location determination module 422 to characterize the current location of electronic display 322 as a public location even if it would otherwise not be characterized as a public location.

In some embodiments the microphone 416 may provide input for the ambient noise detection module 420 to detect an ambient noise level in the environment or region around the electronic display 322. The noise level may be used by the public/private location determination module 422 to characterize the current location of electronic display 322 as a public location or a private location. For example, a private space may be relatively quiet compared to a public space with an ambient noise level higher than a specified threshold value The public/private location determination module 422 may be configured to consider any or all of the context data described above with respect to GPS receiver 410, a calendar application 412, a Wi-Fi antenna 414 and a microphone 416, location determination module 418, and/or ambient noise detection module 420, and to combine this data in any suitable manner to estimate, or improve upon an estimate, of the location context of the display 322. For example, the public/private location determination module 422 may determine that the electronic display 322 is in a public location where privacy may be needed based on a combination of a detected GPS location and an ambient noise level exceeding a specified threshold value (e.g., 80 decibels).

In an embodiment, the context aware privacy module 314 may be configured to use the public/private location determination module 422 to determine if the electronic display 322 is in a public location based on a location context input 310 exceeding a specified trigger value or it may be configured to determine if the electronic display 322 is in a public location at pre-defined time intervals. In this way, the last location context estimation may be updated based on newer sensor readings, and other location context input 310.

Figure 5:
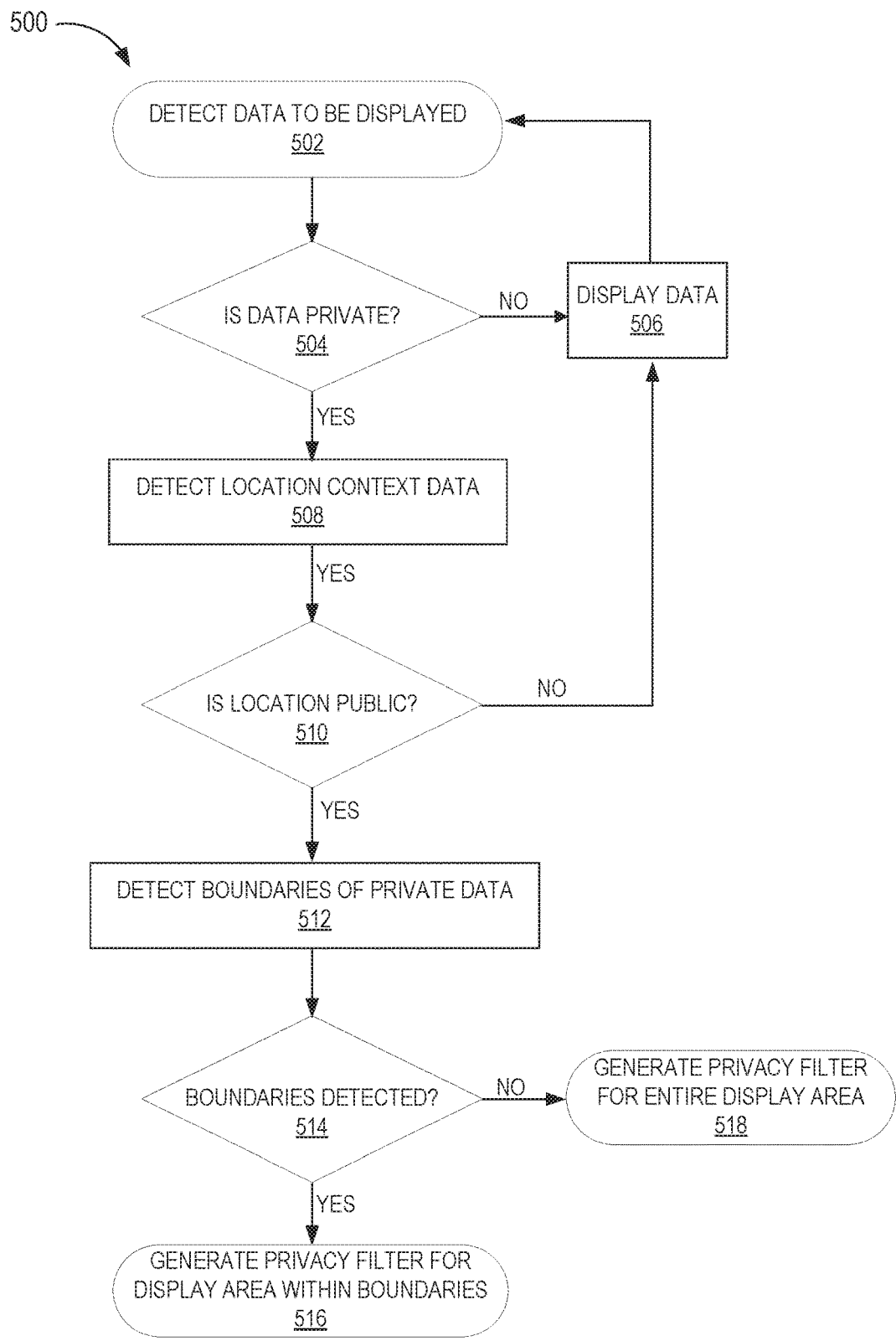
FIG. 5 illustrates a flow diagram of a method for dynamically applying a privacy filter to an electronic display according to one or more embodiments described herein.

FIG. 5 illustrates a flow diagram of a method 500 for dynamically applying a privacy filter to an electronic display 322 according to one or more embodiments described herein. The electronic display 322 may be operating in standard mode of operation without any privacy filters applied or a portion of the electronic display 322 may already be obscured by a dynamically applied privacy filter (e.g., an earlier message in a chain of displayed messages is already obscured). At operation 502, data to be displayed by electronic display 322 is detected. For example, a user opens a document or types in data via a keyboard so that the document or typed in data will then be displayed on at least a portion of the electronic display 322. At operation 504, a determination is made (e.g., based on detected tags) regarding whether the detected data is private. If the detected data is not private then the data is simply displayed on electronic display 322 at operation 506. If the detected data is determined to be private then, at operation 508, location context data is detected (e.g., from GPS receiver 410 and/or microphone 416). At operation 510, a determination is made (e.g., based on an ambient noise level) regarding whether the current location of the electronic display 322 is a private location. If the current location is not determined to be a private location then the method returns to operation 506 in order to simply display the detected data on electronic display 322. If the current location is determined to be a private location then, at operation 512, boundaries of an area of electronic display 322 where the detected data is to be displayed are detected (e.g., a text box defined by application associated with detected data).

At operation 514, it is determined whether any boundaries defining a sub-area of the electronic display 322 where the detected data will be displayed have been detected. If boundaries defining a sub-area of the electronic display 322 where the detected data will be displayed have been detected then, at operation 516, a privacy filter is dynamically generated to obscure the sub-area of the electronic display 322 where the detected data will be displayed so that the detected data cannot be discerned at a wide viewing angle (e.g., 45° or greater). If boundaries defining a sub-area of the electronic display 322 where the detected data will be displayed have not been detected then, at operation 518, a privacy filter is dynamically generated to obscure the entire electronic display 322 so that any data displayed on the entire electronic display 322 cannot be discerned at a wide viewing angle (e.g., 45° or greater). The specifics of the privacy filter are described below with respect to FIG. 6.

Figure 6:
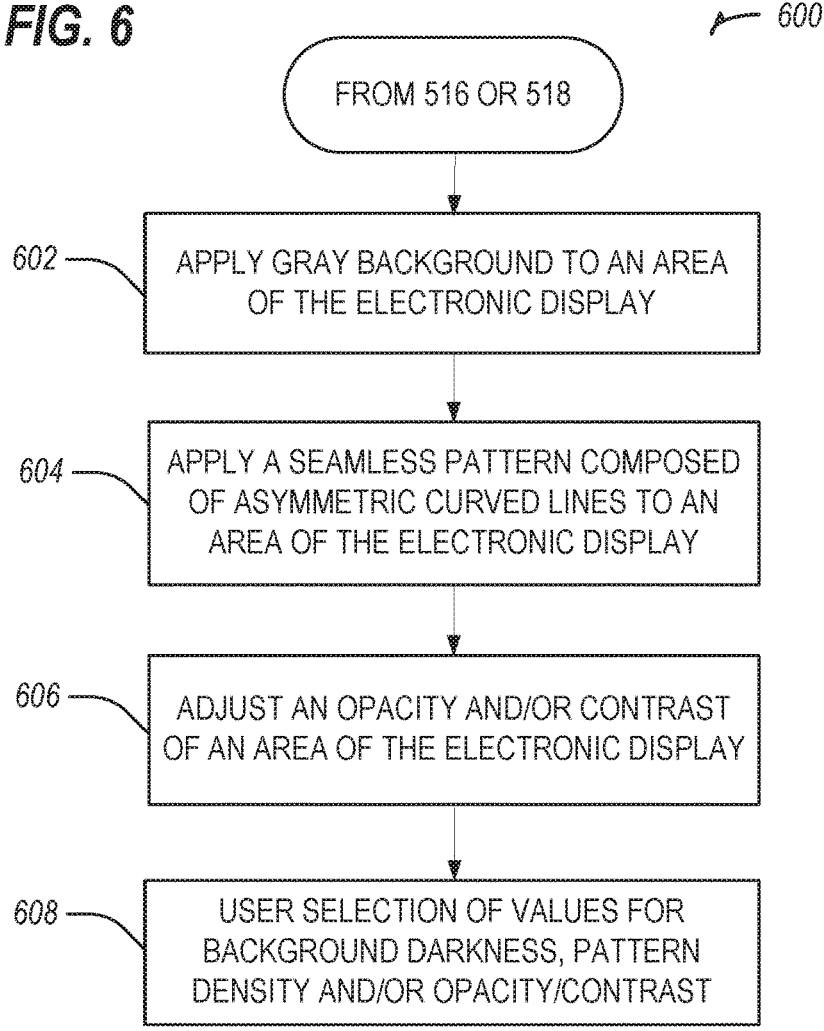
FIG. 6 illustrates a flow diagram of a method for generating a privacy filter for an area of an electronic display according to one or more embodiments described herein.

FIG. 6 illustrates a flow diagram of a method 600 for generating a privacy filter for an area of an electronic display according to one or more embodiments described herein. Method 600 continues from operation 516 or 518 of method 500 of FIG. 5. At operation 602, generating the privacy filter comprises applying a gray (or other suitable color) background of a specified darkness to the electronic display 322 or to a sub-area of the electronic display 322. At operation 604, generating the privacy filter comprises applying a seamless pattern composed of asymmetric curved lines (or another similar pattern) of a specified density to the electronic display 322 or to a sub-area of the electronic display 322. At operation 606, generating the privacy filter comprises adjusting the opacity and/or contrast of the entire electronic display 322 or to a sub-area of the electronic display 322 based on the brightness of the electronic display 322. At operation 606, a user selection of the darkness of the gray background (and/or choose another color), the density of the seamless pattern and/or the level of opacity and/or contrast is received so that the electronic display 322 or to a sub-area of the electronic display 322 is completely obscured to the user in the following viewing conditions: a viewing angle of 45 degrees or more an a viewing distance of 23 inches or more.

Figure 7:
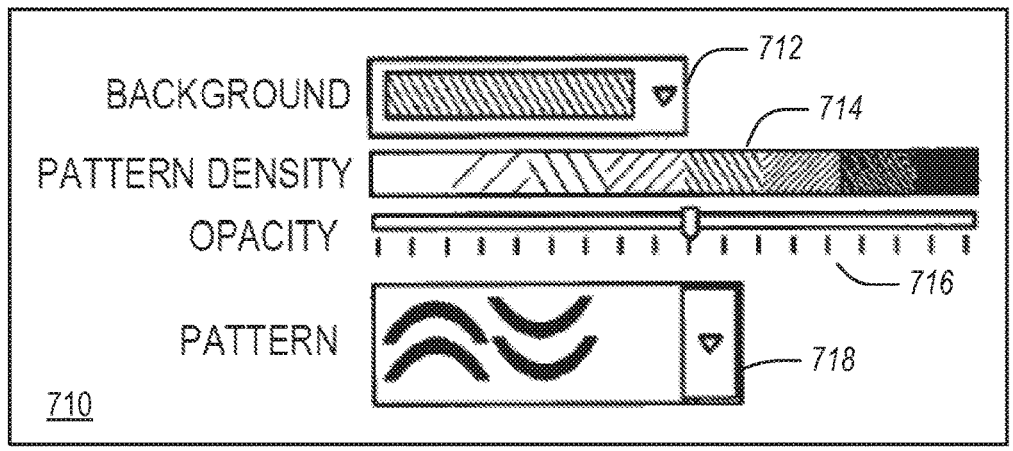
FIG. 7 illustrates a control panel for adjusting values of a privacy filter for an area of an electronic display according to one or more embodiments described herein.

FIG. 7 illustrates a control panel 710 for allowing a user to adjust the values of a privacy filter for an area of an electronic display according to one or more embodiments described herein. For example, the darkness of the gray background may be adjusted with background control 712, the density of the seamless pattern may be adjusted using pattern density control 714. Furthermore, the level of opacity of the electronic display 322 may be adjusted using opacity control 717. Lastly the pattern may be adjusted (e.g., to something similar to asymmetric curved lines) using the pattern control 718. The controls (712, 714, 717 and 718) may be used to select values for the above-noted parameters of the privacy filter so that it is impossible for the user to discern data displayed anywhere on the electronic display 322 or on a determined sub-area of the electronic display 322 in any combination of viewing conditions, including any combination of the following conditions: a viewing angle of 45 degrees, a viewing distance of 23 inches, an ambient light level of 420 lux ambient light and a font size of 10 points or less.

Figure 8:
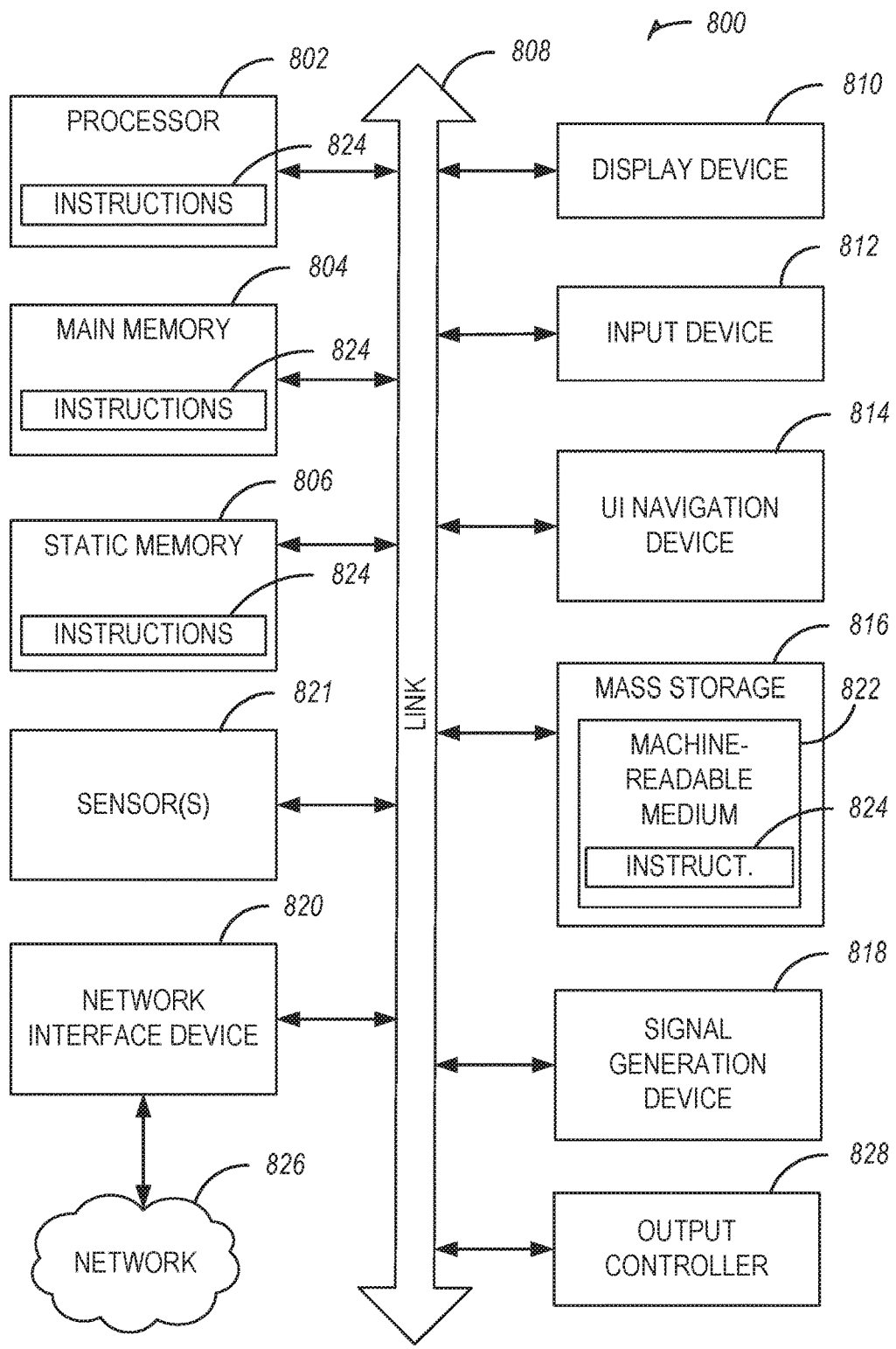
FIG. 8 illustrates a block diagram illustrating an example machine upon which any one or more of the techniques (e.g., methodologies) discussed herein may perform, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, gyrometer, magnetometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

ADDITIONAL NOTES & EXAMPLES

Example 1 is a system for dynamic application of a privacy filter on an electronic display, the system comprising: a processor; and a memory coupled to the processor, the memory including instructions, which when executed by the processor, cause the system to: determine that data to be displayed on the electronic display is private; determine a location context for the electronic display; determine boundaries associated with an area of the electronic display where the private data is to be displayed; and generate a privacy filter based on the data, the location context and the boundaries, wherein the privacy filter is configured to restrict the viewing angle of the area of the electronic display where the private data is to be displayed.

In Example 2, the subject matter of Example 1 optionally includes wherein the instructions to determine that data to be displayed on the electronic display is private are based on: a type of the data, tags embedded in the data, an application associated with the data or matching the data to personal data of a user.

In Example 3, the subject matter of any one or more of Examples 1-2 optionally include wherein: the instructions to determine the location context for the electronic display comprise instructions to use a global positioning system (GPS) receiver to determine a location of the electronic display; the instructions to generate the privacy filter comprise instructions to determine that the location is a public location.

In Example 4, the subject matter of any one or more of Examples 1-3 optionally include wherein: the instructions to determine the location context for the electronic display comprise instructions to use a calendar application to determine a location of the electronic display; and the instructions to generate the privacy filter comprise instructions to determine that the location is a public location.

In Example 5, the subject matter of any one or more of Examples 1-4 optionally include wherein: the instructions to determine the location context for the electronic display comprise instructions to use an antenna to detect a computer network associated with a location; and the instructions to generate the privacy filter comprise instructions to determine that the location is a public location.

In Example 6, the subject matter of any one or more of Examples 1-5 optionally include wherein: the instructions to determine the location context for the electronic display comprise instructions to use a microphone to measure ambient noise at a location; and the instructions to generate the privacy filter comprise instructions to determine that the location is a public location.

In Example 7, the subject matter of any one or more of Examples 1-6 optionally include wherein the instructions to determine the boundaries comprise instructions to detect an area of the electronic display associated with text input by a user via a keyboard.

In Example 8, the subject matter of any one or more of Examples 1-7 optionally include wherein the instructions to generate the privacy filter comprise instructions to apply a gray background and a seamless pattern composed of asymmetric curved lines to an area of the electronic display within the determined boundaries.

In Example 9, the subject matter of Example 8 optionally includes wherein the instructions to generate the privacy filter comprise instructions to adjust the opacity or contrast of the electronic display based on the brightness of the electronic display.

In Example 10, the subject matter of Example 9 optionally includes wherein the instructions to generate the privacy filter comprise instructions to receive a user selection of a darkness of the gray background, a density of the seamless pattern and a level of opacity or contrast of the electronic display such that the data is completely obscured to the user at a viewing angle of 45 degrees or more and a viewing distance of 23 inches or more.

Example 11 is a method for dynamic application of a privacy filter on an electronic display, said method comprising: determining that data to be displayed on the electronic display is private; determining a location context for the electronic display; determining boundaries associated with an area of the electronic display where the private data is to be displayed; and generating a privacy filter based on the data, the location context and the boundaries, wherein the privacy filter is configured to restrict the viewing angle of the area of the electronic display where the private data is to be displayed.

In Example 12, the subject matter of Example 11 optionally includes wherein determining that data to be displayed on the electronic display is private is based on: a type of the data, tags embedded in the data, an application associated with the data or matching the data to personal data of a user.

In Example 13, the subject matter of any one or more of Examples 11-12 optionally include wherein: determining the location context for the electronic display comprises using a global positioning system (GPS) receiver to determine a location of the electronic display; and generating the privacy filter comprises determining that the location is a public location.

In Example 14, the subject matter of any one or more of Examples 11-13 optionally include wherein: determining the location context for the electronic display comprises using a calendar application to determine a location of the electronic display; and generating the privacy filter comprises determining that the location is a public location.

In Example 15, the subject matter of any one or more of Examples 11-14 optionally include wherein: determining the location context for the electronic display comprises using an antenna to detect a computer network associated with a location; and generating the privacy filter comprises determining that the location is a public location.

In Example 16, the subject matter of any one or more of Examples 11-15 optionally include wherein: determining the location context for the electronic display comprises using a microphone to measure ambient noise at a location; and generating the privacy filter comprises determining that the location is a public location.

In Example 17, the subject matter of any one or more of Examples 11-16 optionally include wherein determining the boundaries comprises detecting an area of the electronic display associated with text input by a user via a key board.

In Example 18, the subject matter of any one or more of Examples 11-17 optionally include wherein generating the privacy filter comprises applying a gray background and a seamless pattern composed of asymmetric curved lines to an area of the electronic display within the determined boundaries.

In Example 19, the subject matter of Example 18 optionally includes wherein generating the privacy filter comprises adjusting the opacity or contrast of the electronic display based on the brightness of the electronic display.

In Example 20, the subject matter of Example 19 optionally includes wherein generating the privacy filter comprises receiving a user selection of a darkness of the gray background, a density of the seamless pattern and a level of opacity or contrast of the electronic display such that the data is completely obscured to the user at a viewing angle of 45 degrees or more and a viewing distance of 23 inches or more.

Example 21 is a computer-readable storage medium having instructions stored thereon for dynamic application of a privacy filter on an electronic display, which when executed by a processor of a machine, cause the machine to: determine that data to be displayed on the electronic display is private; determine a location context for the electronic display; determine boundaries associated with an area of the electronic display where the private data is to be displayed; and generate a privacy filter based on the data, the location context and the boundaries, wherein the privacy filter is configured to restrict the viewing angle of the area of the electronic display where the private data is to be displayed.

In Example 22, the subject matter of Example 21 optionally includes wherein the instructions to determine that data to be displayed on the electronic display is private are based on: a type of the data, tags embedded in the data, an application associated with the data or matching the data to personal data of a user.

In Example 23, the subject matter of any one or more of Examples 21-22 optionally include wherein: the instructions to determine the location context for the electronic display comprise instructions to use a global positioning system (GPS) receiver to determine a location of the electronic display; and the instructions to generate the privacy filter comprise instructions to determine that the location is a public location.

In Example 24, the subject matter of any one or more of Examples 21-23 optionally include wherein: the instructions to determine the location context for the electronic display comprise instructions to use a calendar application to determine a location of the electronic display; and the instructions to generate the privacy filter comprise instructions to determine that the location is a public location.

In Example 25, the subject matter of any one or more of Examples 21-24 optionally include wherein: the instructions to determine the location context for the electronic display comprise instructions to use an antenna to detect a computer network associated with a location; and the instructions to generate the privacy filter comprise instructions to determine that the location is a public location.

In Example 26, the subject matter of any one or more of Examples 21-25 optionally include wherein: the instructions to determine the location context for the electronic display comprise instructions to use a microphone to measure ambient noise at a location; and the instructions to generate the privacy filter comprise instructions to determine that the location is a public location.

In Example 27, the subject matter of any one or more of Examples 21-26 optionally include wherein the instructions to determine the boundaries comprise instructions to detect an area of the electronic display associated with text input by a user via a keyboard.

In Example 28, the subject matter of any one or more of Examples 21-27 optionally include wherein the instructions to generate the privacy filter comprise instructions to apply a gray background and a seamless pattern composed of asymmetric curved lines to an area of the electronic display within the determined boundaries.

In Example 29, the subject matter of Example 28 optionally includes wherein the instructions to generate the privacy filter comprise instructions to adjust the opacity or contrast of the electronic display based on the brightness of the electronic display.

In Example 30, the subject matter of Example 29 optionally includes wherein the instructions to generate the privacy filter comprise instructions to receive a user selection of a darkness of the gray background, a density of the seamless pattern and a level of opacity or contrast of the electronic display such that the data is completely obscured to the user at a viewing angle of 45 degrees or more and a viewing distance of 23 inches or more.

Example 31 is at least one machine-readable medium including instructions, which when executed by a machine, cause the machine to perform operations of any of the methods of Examples 11-20.

Example 32 is an apparatus comprising means for performing any of the methods of Examples 11-20.

Example 33 is an apparatus for dynamic application of a privacy filter on an electronic display, the apparatus comprising: means for determining that data to be displayed on the electronic display is private; means for determining a location context for the electronic display; means for determining boundaries associated with an area of the electronic display where the private data is to be displayed; and means for generating a privacy filter based on the data, the location context and the boundaries, wherein the privacy filter is configured to restrict the viewing angle of the area of the electronic display where the private data is to be displayed.

In Example 34, the subject matter of Example 33 optionally includes wherein determining that data to be displayed on the electronic display is private is based on: a type of the data, tags embedded in the data, an application associated with the data or matching the data to personal data of a user.

In Example 35, the subject matter of any one or more of Examples 33-34 optionally include wherein: the means for determining the location context for the electronic display comprise a global positioning system (GPS) receiver to determine a location of the electronic display; and the means for generating the privacy filter comprise means for determining that the location is a public location.

In Example 36, the subject matter of any one or more of Examples 33-35 optionally include wherein: the means for determining the location context for the electronic display comprise a calendar application to determine a location of the electronic display; and the means for generating the privacy filter comprise means for determining that the location is a public location.

In Example 37, the subject matter of any one or more of Examples 33-36 optionally include wherein: the means for determining the location context for the electronic display comprise an antenna to detect a computer network associated with a location; and the means for generating the privacy filter comprise means for determining that the location is a public location.

In Example 38, the subject matter of any one or more of Examples 33-37 optionally include wherein: the means for determining the location context for the electronic display comprise a microphone to measure ambient noise at a location; and the means for generating the privacy filter comprise means for determining that the location is a public location.

In Example 39, the subject matter of any one or more of Examples 33-38 optionally include wherein the means for determining the boundaries comprise means for detecting an area of the electronic display associated with text input by a user via a keyboard.

In Example 40, the subject matter of any one or more of Examples 33-39 optionally include wherein the means for generating the privacy filter comprise means for applying a gray background and a seamless pattern composed of asymmetric curved lines to an area of the electronic display within the determined boundaries.

In Example 41, the subject matter of Example 40 optionally includes wherein the means for generating the privacy filter comprise means for adjusting the opacity or contrast of the electronic display based on the brightness of the electronic display.

In Example 42, the subject matter of Example 41 optionally includes wherein the means for generating the privacy filter comprise means for receiving a user selection of a darkness of the gray background, a density of the seamless pattern and a level of opacity or contrast of the electronic display such that the data is completely obscured to the user at a viewing angle of 45 degrees or more and a viewing distance of 23 inches or more.

Example 43 is a system for providing feedback based on detected gestures, the system comprising: a private data detection module configured to determine that data to be displayed on the electronic display is private; a context aware privacy module configured to determine a location context for the electronic display; a data boundaries detection module configured to determine boundaries associated with an area of the electronic display where the private data is to be displayed; and a privacy filter generation module configured to generate a privacy filter based on the data, the location context and the boundaries, wherein the privacy filter is configured to restrict the viewing angle of the area of the electronic display where the private data is to be displayed.

In Example 44, the subject matter of Example 43 optionally includes wherein the private data detection module is configured to determine that data to be displayed on the electronic display is private is based on: a type of the data, tags embedded in the data, an application associated with the data or matching the data to personal data of a user.

In Example 45, the subject matter of any one or more of Examples 43-44 optionally include wherein: the context aware privacy module is configured to determine the location context for the electronic display by using a global positioning system (GPS) receiver to determine a location of the electronic display; and the privacy filter generation module is configured to generate the privacy filter based on determining that the location is a public location.

In Example 46, the subject matter of any one or more of Examples 43-45 optionally include wherein: the context aware privacy module is configured to determine the location context for the electronic display by using a calendar application to determine a location of the electronic display; and the privacy filter generation module is configured to generate the privacy filter based on determining that the location is a public location.

In Example 47, the subject matter of any one or more of Examples 43-46 optionally include wherein: the context aware privacy module is configured to determine the location context for the electronic display by using an antenna to detect a computer network associated with a location; and the privacy filter generation module is configured to generate the privacy filter based on determining that the location is a public location.

In Example 48, the subject matter of any one or more of Examples 43-47 optionally include wherein; the context aware privacy module is configured to determine the location context for the electronic display by using a microphone to measure ambient noise at a location; and the privacy filter generation module is configured to generate the privacy filter based on determining that the location is a public location.

In Example 49, the subject matter of any one or more of Examples 43-48 optionally include wherein the data boundaries detection module is configured to determine the boundaries by detecting an area of the electronic display associated with text input by a user via a keyboard.

In Example 50, the subject matter of any one or more of Examples 43-49 optionally include wherein the privacy filter generation module is configured to generate the privacy filter by applying a gray background and a seamless pattern composed of asymmetric curved lines to an area of the electronic display within the determined boundaries.

In Example 51, the subject matter of Example 50 optionally includes wherein the privacy filter generation module is configured to generate the privacy filter by adjusting the opacity or contrast of the electronic display based on the brightness of the electronic display.

In Example 52, the subject matter of Example 51 optionally includes wherein the privacy filter generation module is configured to generate the privacy filter by receiving a user selection of a darkness of the gray background, a density of the seamless pattern and a level of opacity or contrast of the electronic display such that the data is completely obscured to the user at a viewing angle of 45 degrees or more and a viewing distance of 23 inches or more.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "a and/or b" is used to denote "a" or "b" or "a and b". In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for dynamic application of a privacy filter on an electronic display, the system comprising:
   a processor; and
   a memory coupled to the processor, the memory including instructions which, when executed by the processor, cause the system to:
      determine that data to be displayed on the electronic display is private;

determine a location context for the electronic display;
attempt to determine boundaries associated with an area of the electronic display where the private data is to be displayed;
automatically detect whether boundaries have been determined via the attempt;
generate a privacy filter based on the data and the location context, wherein the privacy filter is configured to restrict the viewing angle of the area of the electronic display where the private data is to be displayed, and wherein the privacy filter is displayed to cover the area of the electronic display within the boundaries when the boundaries are determined; and
generate the privacy filter based on the data and the location context, the privacy filter displayed to cover the entire area of the electronic display when the boundaries are not determined.

2. The system of claim 1, wherein the instructions to determine that data to be displayed on the electronic display is private are based on: a type of the data, tags embedded in the data, an application associated with the data or matching the data to personal data of a user.

3. The system of claim 1, wherein:
the instructions to determine the location context for the electronic display comprise instructions to use a global positioning system (GPS) receiver to determine a location of the electronic display; and
the instructions to generate the privacy filter comprise instructions to determine that the location is a public location.

4. The system of claim 1, wherein:
the instructions to determine the location context for the electronic display comprise instructions to use a calendar application to determine a location of the electronic display; and
the instructions to generate the privacy filter comprise instructions to determine that the location is a public location.

5. The system of claim 1, wherein:
the instructions to determine the location context for the electronic display comprise instructions to use an antenna to detect a computer network associated with a location; and
the instructions to generate the privacy filter comprise instructions to determine that the location is a public location.

6. The system of claim 1, wherein:
the instructions to determine the location context for the electronic display comprise instructions to use a microphone to measure ambient noise at a location; and
the instructions to generate the privacy filter comprise instructions to determine that the location is a public location.

7. The system of claim 1, wherein the instructions to attempt to determine the boundaries comprise instructions to detect an area of the electronic display associated with text input by a user via a keyboard.

8. The system of claim 1, wherein the instructions to generate the privacy filter comprise instructions to apply a gray background and a seamless pattern composed of asymmetric curved lines to an area of the electronic display within the determined boundaries.

9. The system of claim 8, wherein the instructions to generate the privacy filter comprise instructions to adjust the opacity or contrast of the electronic display based on the brightness of the electronic display.

10. The system of claim 9, wherein the instructions to generate the privacy filter comprise instructions to receive a user selection of a darkness of the gray background, a density of the seamless pattern and a level of opacity or contrast of the electronic display such that the data is completely obscured to the user at a viewing angle of 45 degrees or more and a viewing distance of 23 inches or more.

11. A method for dynamic application of a privacy filter on an electronic display, said method comprising:
determining that data to be displayed on the electronic display is private;
determining a location context for the electronic display;
attempting to determine boundaries associated with an area of the electronic display where the private data is to be displayed;
automatically detecting whether boundaries have been determined via the attempt;
generating a privacy filter based on the data and the location context, wherein the privacy filter is configured to restrict the viewing angle of the area of the electronic display where the private data is to be displayed, and wherein the privacy filter is displayed to cover the area of the electronic display within the boundaries when the boundaries are determined; and
generating the privacy filter based on the data and the location context, the privacy filter displayed to cover the entire area of the electronic display when the boundaries are not determined.

12. The method of claim 11, wherein determining that data to be displayed on the electronic display is private is based on: a type of the data, tags embedded in the data, an application associated with the data or matching the data to personal data of a user.

13. The method of claim 11, wherein:
determining the location context for the electronic display comprises using a global positioning system (GPS) receiver to determine a location of the electronic display; and
generating the privacy filter comprises determining that the location is a public location.

14. The method of claim 11, wherein:
determining the location context for the electronic display comprises using a calendar application to determine a location of the electronic display; and
generating the privacy filter comprises determining that the location is a public location.

15. The method of claim 11, wherein:
determining the location context for the electronic display comprises using an antenna to detect a computer network associated with a location; and
generating the privacy filter comprises determining that the location is a public location.

16. The method of claim 11, wherein:
determining the location context for the electronic display comprises using a microphone to measure ambient noise at a location; and
generating the privacy filter comprises determining that the location is a public location.

17. The method of claim 11, wherein attempting to determine the boundaries comprises detecting an area of the electronic display associated with text input by a user via a keyboard.

18. The method of claim 11, wherein generating the privacy filter comprises applying a gray background and a seamless pattern composed of asymmetric curved lines to an area of the electronic display within the determined boundaries.

19. The method of claim 18, wherein generating the privacy filter comprises adjusting the opacity or contrast of the electronic display based on the brightness of the electronic display.

20. The method of claim 19, wherein generating the privacy filter comprises receiving a user selection of a darkness of the gray background, a density of the seamless pattern and a level of opacity or contrast of the electronic display such that the data is completely obscured to the user at a viewing angle of 45 degrees or more and a viewing distance of 23 inches or more.

21. At least one non-transitory computer-readable storage medium having instructions stored thereon for dynamic application of a privacy filter on an electronic display, which when executed by a processor of a machine, cause the machine to:
   determine that data to be displayed on the electronic display is private;
   determine a location context for the electronic display;
   attempt to determine boundaries associated with an area of the electronic display where the private data is to be displayed;
   automatically detect whether boundaries have been determined via the attempt;
   generate a privacy filter based on the data and the location context, wherein the privacy filter is configured to restrict the viewing angle of the area of the electronic display where the private data is to be displayed, and wherein the privacy filter is displayed to cover the area of the electronic display within the boundaries when the boundaries are determined; and
   generate the privacy filter based on the data and the location context, the privacy filter displayed to cover the entire area of the electronic display when the boundaries are not determined.

22. The non-transitory computer-readable storage medium of claim 21, wherein the instructions to determine that data to be displayed on the electronic display is private are based on: a type of the data, tags embedded in the data, an application associated with the data or matching the data to personal data of a user.

23. The non-transitory computer-readable storage medium of claim 21, wherein:
   the instructions to determine the location context for the electronic display comprise instructions to use a global positioning system (GPS) receiver to determine a location of the electronic display; and
   the instructions to generate the privacy filter comprise instructions to determine that the location is a public location.

24. The non-transitory computer-readable storage medium of claim 21, wherein the instructions to attempt to determine the boundaries comprise instructions to detect an area of the electronic display associated with text input by a user via a keyboard.

25. The non-transitory computer-readable storage medium of claim 21, wherein the instructions to generate the privacy filter comprise:
   instructions to apply a gray background and a seamless pattern composed of asymmetric curved lines to an area of the electronic display within the determined boundaries; and
   instructions to adjust the opacity or contrast of the electronic display based on the brightness of the electronic display.

* * * * *

UNITED STATES PATENT AND TRADEMARK OFFICE
CERTIFICATE OF CORRECTION

PATENT NO. : 10,496,831 B2  
APPLICATION NO. : 15/270343  
DATED : December 3, 2019  
INVENTOR(S) : Lancioni et al.

Page 1 of 1

It is certified that error appears in the above-identified patent and that said Letters Patent is hereby corrected as shown below:

On the Title Page

Item (72), in "Inventors", in Column 1, Line 1, delete "Cordova" and insert --Cordoba-- therefor Item (72), in "Inventors", in Column 1, Line 2, delete "Cordova" and insert --Cordoba-- therefor Item (72), in "Inventors", in Column 1, Line 3, delete "Cordova" and insert --Cordoba-- therefor Signed and Sealed this  
Eighteenth Day of August, 2020

Andrei Iancu  
*Director of the United States Patent and Trademark Office*